US010818941B2

(12) United States Patent
Noh et al.

(10) Patent No.: US 10,818,941 B2
(45) Date of Patent: Oct. 27, 2020

(54) SYSTEM AND DEVICE FOR WATER EVAPORATION OF FUEL CELL AND CONTROL METHOD THEREOF

(71) Applicant: HYUNDAI MOTOR COMPANY, Seoul (KR)

(72) Inventors: Yong Gyu Noh, Suwon-si (KR); Hyuck Roul Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 1002 days.

(21) Appl. No.: 15/365,732

(22) Filed: Nov. 30, 2016

(65) Prior Publication Data
US 2018/0102558 A1    Apr. 12, 2018

(30) Foreign Application Priority Data

Oct. 10, 2016 (KR) .................. 10-2016-0130657

(51) Int. Cl.
*H01M 8/04291* (2016.01)
*H01M 8/04225* (2016.01)
(Continued)

(52) U.S. Cl.
CPC ......... *H01M 8/04291* (2013.01); *B60L 50/72* (2019.02); *B60L 58/31* (2019.02);
(Continued)

(58) Field of Classification Search
CPC ......... H01M 8/04291; H01M 8/04302; H01M 8/04425; H01M 8/04253; H01M 8/04156; H01M 8/04225; H01M 8/0485
See application file for complete search history.

(56) References Cited

U.S. PATENT DOCUMENTS

| 5,206,094 A | 4/1993 | Katz |
| 6,013,385 A | 1/2000 | DuBose |
(Continued)

FOREIGN PATENT DOCUMENTS

| JP | 2000315509 A | 11/2000 |
| JP | 2009238393 | 10/2009 |
(Continued)

OTHER PUBLICATIONS

KR Office Action dated Dec. 18, 2017, Office Action in corresponding Korean Patent Application 10-2016-0130657, dated Dec. 18, 2017; 5 pages.

*Primary Examiner* — Stewart A Fraser
(74) *Attorney, Agent, or Firm* — Lempia Summerfield Katz LLC (57) ABSTRACT

A system and device for water evaporation of a fuel cell, and a control method thereof, are disclosed. The system includes a stack provided in a fuel cell vehicle to produce electric power. The system includes an injection member connected to the stack. The injection member retains water generated in the stack, and injects water at high pressure and evaporates injected water particles. The system includes a compressor that supplies high-temperature air to the injection member. Even when the fuel cell vehicle is cold-started, evaporation is enabled through water injection to directly cool air supplied to the stack. Water is evaporated even without a humidifier so that performance of the fuel cell system may be enhanced, while reducing cost.

15 Claims, 7 Drawing Sheets

(51) Int. Cl.
*H01M 8/0432* (2016.01)
*B60L 58/34* (2019.01)
*B60L 50/72* (2019.01)
*H01M 8/04302* (2016.01)
*B60L 58/31* (2019.01)
*H01M 8/04119* (2016.01)
*H01M 8/04223* (2016.01)
*H01M 8/0438* (2016.01)
*H01M 8/04828* (2016.01)
*H01M 8/04664* (2016.01)
*H01M 8/04701* (2016.01)

(52) U.S. Cl.
CPC ........... *B60L 58/34* (2019.02); *H01M 8/0485* (2013.01); *H01M 8/04156* (2013.01); *H01M 8/04225* (2016.02); *H01M 8/04253* (2013.01); *H01M 8/04302* (2016.02); *H01M 8/04373* (2013.01); *H01M 8/04425* (2013.01); *H01M 8/04679* (2013.01); *H01M 8/04738* (2013.01); *H01M 2250/20* (2013.01); *Y02T 90/40* (2013.01)

(56) References Cited

U.S. PATENT DOCUMENTS

| | | | |
|---|---|---|---|
| 6,584,789 | B2 | 7/2003 | Ishikawa |
| 6,635,374 | B1 | 10/2003 | Aramaki |
| 2003/0190513 | A1 | 10/2003 | Meissner et al. |
| 2015/0079489 | A1* | 3/2015 | Noh .................. H01M 8/04074 429/434 |
| 2015/0155573 | A1 | 6/2015 | Jo et al. |
| 2015/0349361 | A1* | 12/2015 | Kwon ............... H01M 8/04291 429/450 |

FOREIGN PATENT DOCUMENTS

| | | |
|---|---|---|
| JP | 4559693 A | 10/2010 |
| KR | 101001589 B1 | 12/2010 |
| KR | 1020150062508 | 6/2015 |
| KR | 101535026 B1 | 7/2015 |

\* cited by examiner

SYSTEM AND DEVICE FOR WATER EVAPORATION OF FUEL CELL AND CONTROL METHOD THEREOF

CROSS-REFERENCE TO RELATED APPLICATION

This application is based on and claims the benefit of priority to Korean Patent Application No. 10-2016-0130657, filed on Oct. 10, 2016, in the Korean Intellectual Property Office, the disclosure of which is incorporated herein in its entirety by reference.

TECHNICAL FIELD

The present disclosure relates generally to water evaporation of a fuel cell, and more particularly, to a system and device for water evaporation of a fuel cell, enabling evaporation through water injection when a fuel cell vehicle is cold-started, and to a control method thereof.

BACKGROUND

In general, a fuel cell system of a fuel cell vehicle, generating electric power according to an electrochemical reaction between oxygen and hydrogen, includes a fuel cell stack generating electric energy, a fuel supply device supplying fuel (hydrogen) to the fuel cell stack, an air supply device supplying oxygen in the air as an oxidizing agent required for an electrochemical reaction to the fuel cell stack, and a heat and water management device controlling an operation temperature of the fuel cell stack.

In an operation of the fuel cell system, nitrogen or water is accumulated on a hydrogen electrode (anode) side of the fuel cell stack to degrade performance of the stack. Thus, stable performance of the stack is required to be secured by periodically purging the hydrogen electrode.

Thus, in order to remove water generated or condensed in the fuel cell stack, a water trap (reservoir) is installed in a fuel supply line. The water trap is a sort of water discharge device for receiving water from the stack and draining water when a water level reaches a predetermined level.

Unlike a general internal combustion engine, a fuel cell requires a compressor for supplying oxygen. The supplied air from the compressor has a compression ratio of 1.5 to 3. As a result, a compressor outlet is heated to a high temperature, such as 100° C. or higher.

Also, high power operation of a fuel cell in a high temperature environment requires a greater amount of humidification. Since a great amount of heat generated by the stack is required to be discharged through a heat radiation device such as a radiator, a humidifier is essential. A system having a high compression ratio requires an intercooler as an essential element, increasing a volume, and thus, for a cold start in a low temperature environment, performance of the fuel cell system is degraded.

Korean Patent No. 10-1535026 discloses a known fuel cell system of the type described above.

SUMMARY

The present disclosure has been made to solve the above-mentioned problems occurring in the prior art while advantages achieved by the prior art are maintained intact.

An aspect of the present disclosure provides a system and device for water evaporation of a fuel cell, and a control method thereof. The disclosed system, device, and control method enable evaporation through water injection when a fuel cell vehicle is cold-started.

According to one embodiment of the present disclosure, a system for water evaporation of a fuel cell includes: a stack provided in a fuel cell vehicle to produce electric power; an injection member connected to the stack, retaining water generated in the stack, and injecting water at high pressure to prevent moisture from being frozen; and a compressor that supplies high-temperature air to the injection member.

The injection member may include: a pump part that retains water generated in the stack and that injects water at high pressure; a cooler part connected to the pump part and allowing injected water particles and high-temperature air supplied through the compressor to be mixed to evaporate water particles; and a controller that controls the pump part and the cooler part.

The pump part may include: a water tank that retains water discharged or collected from the stack; and a high pressure pump provided within the water tank and supplying high-pressure water to the cooler part.

The water tank may have a drain valve that drains water to adjust a water level of the water tank.

The pump part may include: a first pipe that connects the high pressure pump and the cooler part and that allows air to be supplied through the compressor; a heater connected to the high pressure pump and generating heat; and a second pipe that connects the high pressure pump and the heater.

The second pipe may be provided such that an outlet thereof is perpendicular to the ground to prevent introduction of water retained in the water tank.

An additional water tank, which includes the heater, may be provided within the water tank. The additional water tank may have a water hole allowing water to be introduced from the water tank.

The cooler part may include a valve that controls supply or cutoff of water from the high pressure pump, and that allows air from the compressor to be supplied to the first pipe when the high pressure pump is reversely rotated.

The cooler part may further include: a nozzle that injects water supplied from the high pressure pump; and an evaporator that evaporates water particles injected from the nozzle.

The cooler part may have a temperature sensor that senses a temperature of an outlet of the compressor and a temperature of an outlet of the evaporator.

The cooler part may have a pressure sensor that senses pressure of water supplied from the pump part.

According to another embodiment of the present disclosure, a device for water evaporation of a fuel cell includes: a water tank provided in a fuel cell vehicle, connected to a stack that produces electric power, and retaining water generated in the stack; a high pressure pump provided in the water tank and supplying water at high pressure; a valve connected to the high pressure pump and controlling supply and cutoff of water; a nozzle that injects water supplied from the high pressure pump; a compressor that supplies high-temperature air toward water particles injected from the nozzle; and an evaporator provided at one end of the nozzle and allowing injected water particles and air from the compressor to be mixed to evaporate water.

The nozzle may determine a water injection angle and water particle size.

The device for water evaporation of a fuel cell may further include: a temperature sensor that senses a temperature of the compressor and a temperature of the evaporator; and a pressure sensor that senses water pressure of the high pressure pump.

According to another embodiment of the present disclosure, a control method for water evaporation of a fuel cell includes the steps of: stopping water injection from a nozzle provided in a cooler part and stopping an operation of a high pressure pump provided in a pump part when a fuel cell vehicle is stopped; reversely rotating the high pressure pump and maintaining air pressure of the compressor; opening a valve provided in the cooler part and supplying air from the compressor to the inside of a water tank provided in the pump part; and closing the valve and stopping an operation of the compressor.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, various embodiments of the present disclosure will be described in detail with reference to the accompanying drawings.

Figure 1:
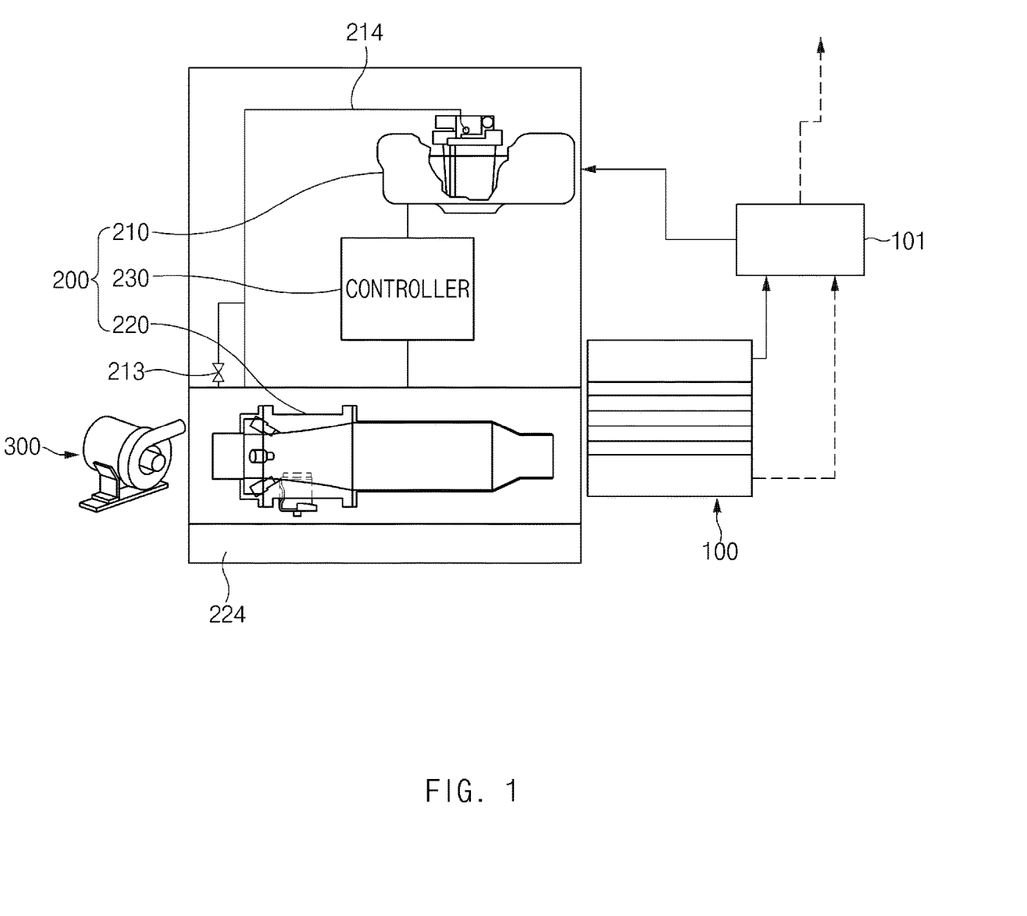
FIG. 1 is a view illustrating a system for water evaporation of a fuel cell according to an embodiment of the present disclosure.
Figure 2:
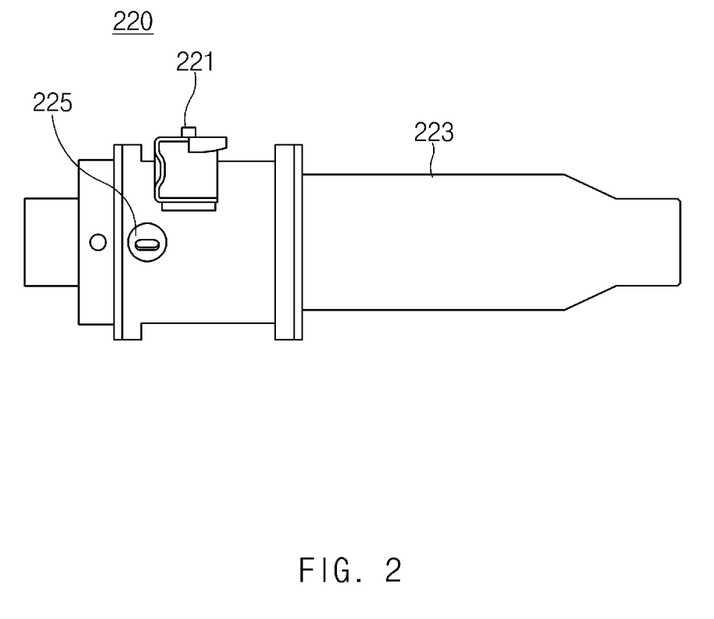
FIG. 2 is a view illustrating one side of a cooler part of a system for water evaporation of a fuel cell according to an embodiment of the present disclosure.
Figure 3:
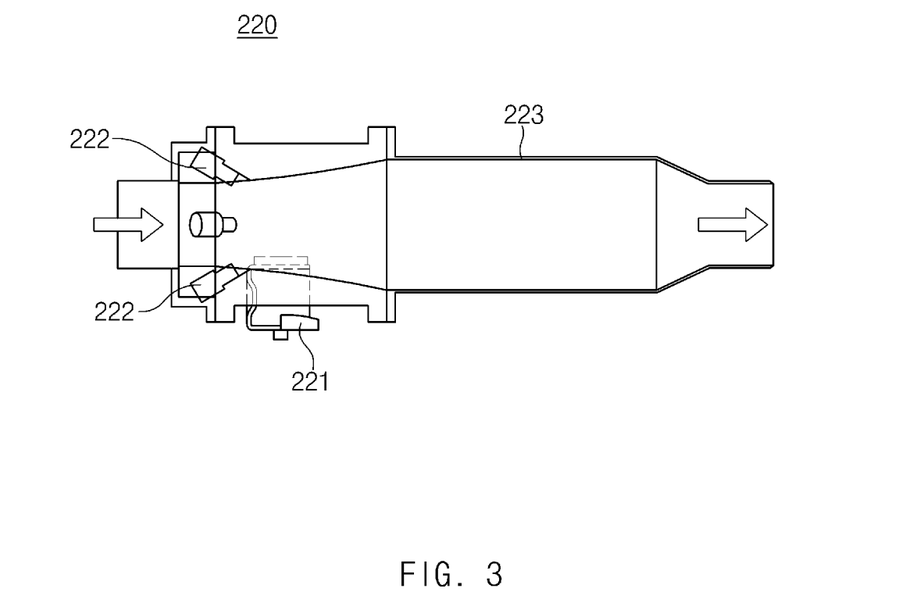
FIG. 3 is a view illustrating the other side of a cooler part of a system for water evaporation of a fuel cell according to an embodiment of the present disclosure.

FIGS. 1-3 illustrate a system for water evaporation of a fuel cell according to an embodiment of the present disclosure. The system includes a stack 100 provided in a fuel cell vehicle, an injection member 200 that injects water generated in the stack 100, and a compressor 300 that supplies air to the injection member 200.

The stack 100 is provided in a fuel cell vehicle and generates electric energy.

The injection member 200 is connected to the stack 100. The injection member 200 retains water generated when electric energy is generated, and injects water at high pressure to prevent moisture from being frozen. In this embodiment, a separate water collecting device 101 is provided between the stack 100 and the injection member 200. The separate water collecting device 101 collects water generated in the stack 100 so that collected water is transferred to the injection member 200.

The compressor 300 is connected to the injection member 200 and supplies high-temperature air to the injection member 200 to cause water particles to evaporate.

Although an ambient temperature is a low temperature, the air temperature is significantly increased as the compressor 300 heats the air. As a result, without use of a humidifier, appropriate cooling is achieved using water in such a system, as in the present disclosure.

In this embodiment, the injection member 200 includes a pump unit 210 that supplies stored or retained water at high pressure. The injection member 200 also includes a cooler part 220 that evaporates injected water particles and a controller 230 that controls the pump part 210 and the cooler part 220.

The pump part 210 retains water that is generated in the stack 100. The pump part also supplies water to the cooler part 220 at high pressure.

The cooler part 220 is connected to the pump part 210. The cooler part 220 mixes injected water particles and high-temperature air supplied through the compressor 300 to evaporate water particles.

The controller 230 controls the pump part 210 and the cooler part 220 to cause water particles to be finally evaporated from the cooler part 220.

Figure 5:
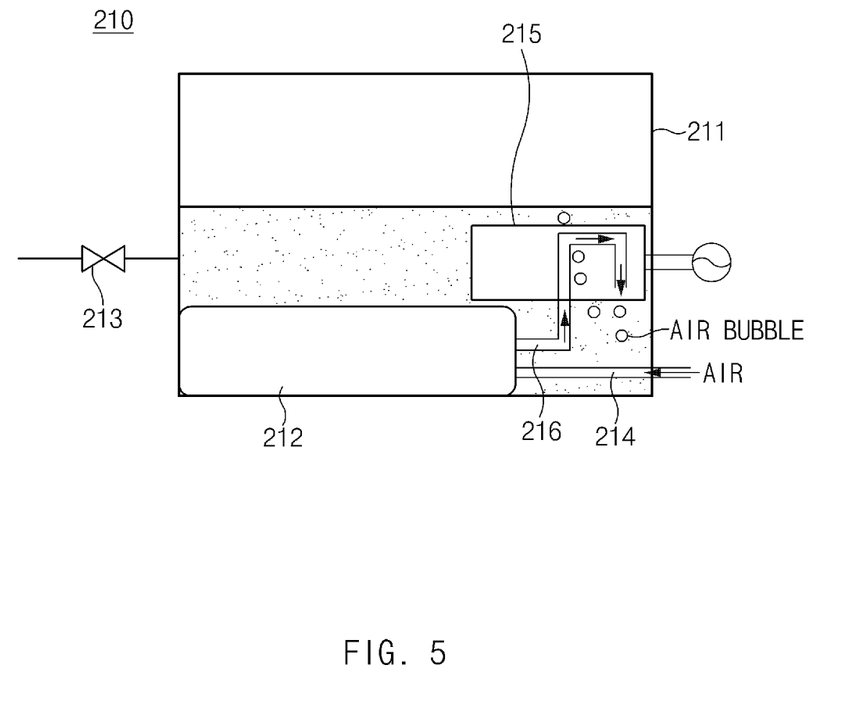
FIG. 5 is a cross-sectional view illustrating a pump part of a system for water evaporation of a fuel cell according to an embodiment of the present disclosure.
Figure 6:
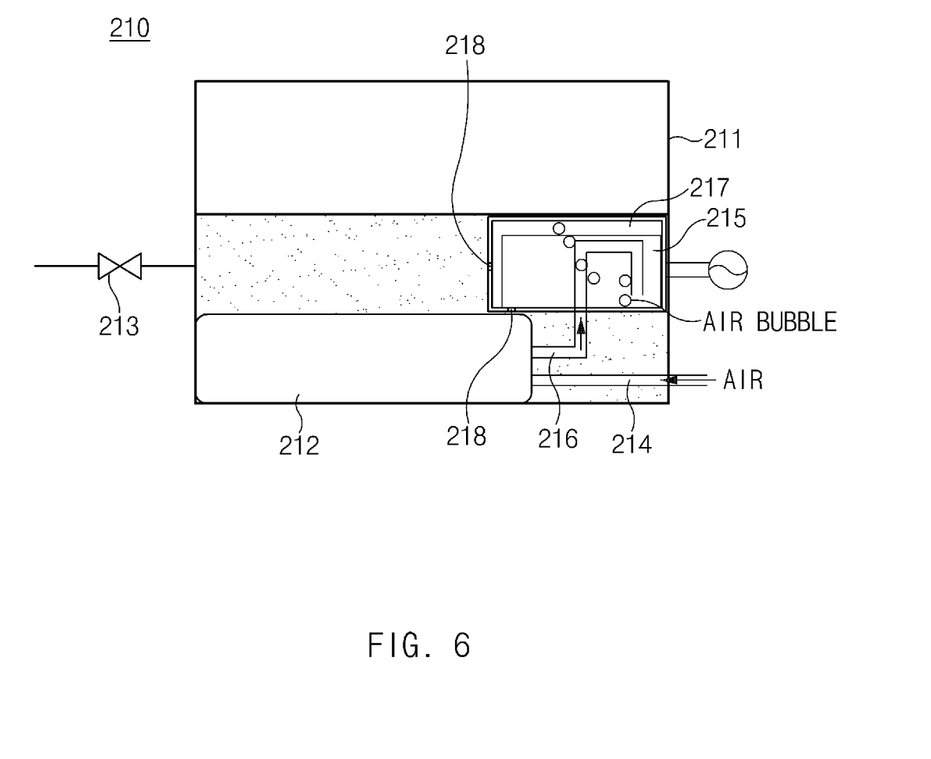
FIG. 6 is a cross-sectional view illustrating a pump part of a system for water evaporation of a fuel cell according to another embodiment of the present disclosure.

Also, as illustrated in FIGS. 5 and 6, the pump part 210 includes a water tank 211 that retains water discharged or collected from the stack 100. The pump part 210 also includes a high pressure pump 212 provided within the water tank 211 and supplying water at high pressure to the cooler part 220.

In this embodiment, the water tank 211 may have a drain valve 213 that drains water to adjust a water level of the water tank 211. By doing so, an appropriate water level may be maintained in the water tank 211, even in winter in a low temperature state.

Also in this embodiment, the pump part 210 includes a first pipe 214 that connects the high pressure pump 212 and the cooler part 220. The pump part 210 also includes a heater 215 that generates heat. The pump part 210 further includes a second pipe 216 that connects the high pressure pump 212 and the heater 215.

The first pipe 214 connects the high pressure pump 212 and the cooler part 220 and causes air to be supplied through the compressor 300. In this embodiment, the first pipe 214 may drain water retained in the first pipe when the high pressure pump 212 is reversely rotated. The inside of the first pipe 214 is maintained in a vacuum state to allow air from the compressor 300 to be introduced to the pump part 210.

The heater 215 is connected to the high pressure pump 212 and generates heat.

The second pipe 216 connects the high pressure pump 212 and the heater 215.

In this embodiment, the second pipe 216 may have an outlet that is perpendicular with respect to the ground to prevent introduction of water retained in the water tank 211.

In other words, in the present disclosure, when water is injected as a vehicle is stopped, air may be introduced in a reverse direction, relative to a direction in which water flows, and when a minimum amount of water is in contact with the pipe. As illustrated in FIG. 3, with arrangement of the high pressure pump 212, the heater 215, the water tank 211, and the drain valve 213, the inside of the high pressure pump 212 is dried by pressure from the compressor 300 and corresponding air is introduced to the inside of the water tank 211.

In this embodiment, an outlet of the second pipe 216 faces in the direction of the ground such that water may not be introduced by force of gravity.

Also in this embodiment, by closing a valve 221 (as described hereinafter) during an operation of the compressor 300, pressure from the compressor 300 is removed and pressure in the first pipe 214, the inside of the high pressure pump 212, and in the second pipe 216 is maintained to be higher than atmospheric pressure. In this state, when the vehicle is exposed to an ambient temperature below zero, water from a water supply line may be minimized. When the vehicle is started at a temperature below zero, only ice around an inlet may be thawed and water may be pumped and supplied.

Also in this embodiment, as illustrated in FIG. 6, an additional water tank 217 may be provided within the water tank 211. The additional water tank 217 may include a heater 215. A water hole 218 may also be provided on the additional water tank 217 to allow water retained in the water tank 211 to be introduced.

In other words, the additional water tank 217 is provided within the water tank 211 to rapidly obtain water, so that water is available when the vehicle is started. The water hole 218 allows water from the water tank 211 to be introduced into the additional water tank 217.

Because the additional water tank 217 is further disposed within the water tank 211, water within the additional water tank 217 may become frozen less readily or later than water retained in the water tank 211.

In other words, when ambient temperature of air falls, water stored or retained within the water tank 211 is first exposed to the outside air, so that it might freeze first. Water, while being frozen, discharges a large amount of latent heat. That latent heat is absorbed by the additional water tank 217, delaying the time during which water retained within the additional water tank 217 undergoes a phase-change into ice. Also, when ice is thawed, a large quantity of heat is concentratedly supplied to limited ice to rapidly melt the ice and obtain water in a liquid state.

Also in this embodiment, as illustrated in FIGS. 1-4, the cooler part 220 may have the aforementioned valve 221. The valve 221 may be provided for controlling supply or cutoff of water of the high pressure pump 212 and for allowing air of the compressor 300 to be supplied to the first pipe 214 when the high pressure pump 212 is reversely rotated.

Also, as illustrated in FIGS. 2 and 3, the cooler part 220 may have a nozzle 222 and an evaporator 223. The nozzle 222 injects water supplied from the high pressure pump 212. The evaporator 223 evaporates water particles injected from the nozzle 222.

In this embodiment, the evaporator 223 may be formed of woven metal fiber. The woven metal fiber may have a diameter of predetermined micrometers to define a large area and moisturization/content of water.

Also, as illustrated in FIG. 1, the cooler part 220 may have a temperature sensor 224 to sense a temperature of an outlet of the compressor 300 and a temperature of an outlet of the evaporator 223.

Figure 4:
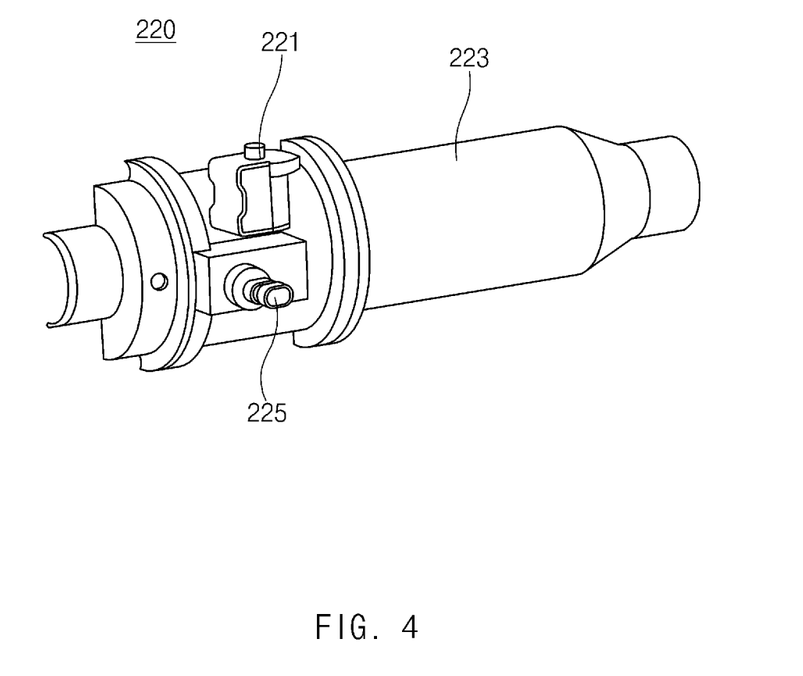
FIG. 4 is a perspective view illustrating a cooler part of a system for water evaporation of a fuel cell according to an embodiment of the present disclosure.

Also, as illustrated in FIGS. 2 and 4, the cooler part 220 may have a pressure sensor 225 to sense pressure of water supplied from the pump part 210.

According to the present disclosure, a temperature of air may be lowered by injecting water to air compressed and heated by the compressor 300. A humidity of air may be increased to provide air appropriate for operating the stack 100.

Also, in order to allow a cold start of the vehicle to be smoothly performed, the pipe and the inside of the pump part 210 are dried using compressed air when the vehicle is stopped. When the vehicle is stopped, the compressor 300 maintains constant pressure. The valve 221 is maintained in an open state to allow dried air to pass through the nozzle 222 and to be discharged to the water tank 211 through the valve 221 and the pump part 210. In this embodiment, air flowing backwards or in the reverse direction may dry every component of a water supply system.

FIGS. 1-6 illustrate a device for water evaporation of a fuel cell according to an embodiment of the present disclosure. The device includes a water tank 211 that retains water generated in the stack 100, a high pressure pump 212 that supplies water at high pressure, a valve 221 that controls supply and cutoff of water, a nozzle 222 that injects water, a compressor 300 that supplies high-temperature air, and an evaporator 223 that evaporates water.

The water tank 211 is connected to the stack 100 that is provided in a fuel cell vehicle and produces electric power. The water tank 211 retains water generated in the stack 100.

The high pressure pump 212 is provided in the water tank 211 and supplies water at high pressure.

The valve 221 is connected to the high pressure pump 212 to control supply or cutoff of water from the high pressure pump 212.

The nozzle 222 injects water supplied from the high pressure pump 212.

In this embodiment, the nozzle 222 may determine a water injection angle and water particle size to enable effective cooling and heat transmission by air supplied through the compressor 300 and water injected from the nozzle 222.

The compressor 300 supplies high-temperature air directed toward water particles injected from the nozzle 222 to cause the water particles to be evaporated.

When the high pressure pump 212 is reversely rotated, air from the compressor 300 is supplied to the high pressure pump 212 through the first pipe 214.

The evaporator 223 is provided at one end of the nozzle 222 and evaporates a mixture of injected water particles and air from the compressor 300.

Also, the device may include a temperature sensor 224 that senses a temperature of the compressor 300 and a temperature of the evaporator 223. The device may also include a pressure sensor 225 that senses water pressure of the high pressure pump 212.

According to the present disclosure, the device includes the water tank 211 connected to the stack 100 provided in a fuel cell vehicle to produce electric power. The water tank 211 retains water generated in the stack 100. The device also includes the high pressure pump 212 provided in the water tank 211 and supplying water at high pressure, the valve 221 connected to the high pressure pump 212 and controlling supply and cutoff of water, the nozzle 222 that injects water supplied from the high pressure pump 212, the compressor 300 that supplies high-temperature air directed toward water particles injected from the nozzle 222, and the evaporator 223 provided at one end of the nozzle 222 and mixing injected water particles and air from the compressor 300 to allow water to be evaporated. Water is injected to air compressed and heated by the compressor 300 to lower a temperature of the air and increase humidity of the air to supply appropriate air in operating the stack 100.

Figure 7:
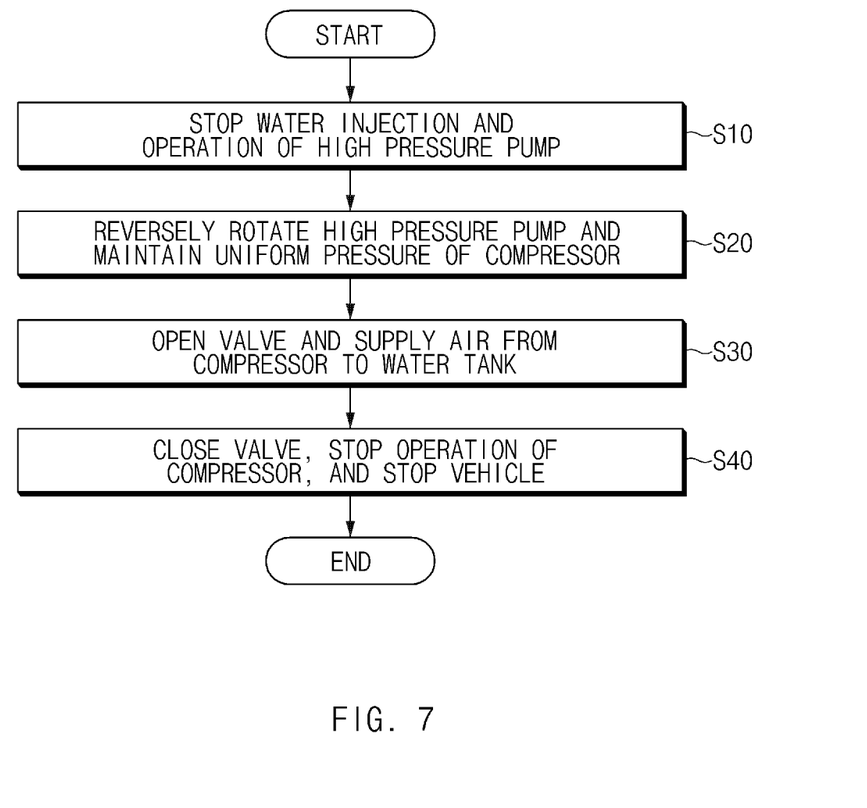
FIG. 7 is a flow chart illustrating a control method for water evaporation of a fuel cell according to an embodiment of the present disclosure.

FIG. 7 illustrates a control method of water evaporation of a fuel cell according to an embodiment of the present disclosure. The control method includes a first operation (S10) of stopping water injection and stopping an operation of the high pressure pump 212. The control method includes a second operation (S20) of reversely rotating the high pressure pump 212. The control method includes a third operation (S30) of supplying air from the compressor 300 to the water tank 211. The control method includes a fourth operation (S40) of stopping an operation of the compressor 300. In this embodiment, components regarding a system and device for water evaporation of a fuel cell may be referred to FIGS. 1-6 and the foregoing description.

In the first operation S10, when a fuel cell vehicle is stopped, water injection of the nozzle 222, provided in the cooler part 220, is stopped. An operation of the high pressure pump 212, provided in the pump part 210, is also stopped.

In the second operation S20, the high pressure pump 212 is reversely rotated and air pressure of the compressor 300 is uniformly maintained.

In the third operation S30, the valve 221, provided in the cooler part 220, is opened. Air from the compressor 300 is supplied to the inside of the water tank 211 provided in the pump part 210.

In the fourth operation S40, the valve 221 is closed, the operation of the compressor 300 is stopped, and the vehicle is subsequently stopped.

The control method of the present disclosure aims to enable a smoothly performed cold start of a vehicle. The control method of water evaporation of a fuel cell according to an embodiment of the present disclosure includes: i) the first operation S10 of stopping water injection from the nozzle 222 provided in the cooler part 220 and stopping an operation of the high pressure pump 212 provided in the pump part 210 when a fuel cell vehicle is stopped; ii) the second operation S20 of reversely rotating the high pressure pump 212 and maintaining air pressure of the compressor 300; iii) the third operation S30 of opening the valve 221 provided in the cooler part 220 and supplying air from the compressor 300 to the inside of the water tank 211 provided in the pump part 210; and iv) the fourth operation S40 of closing the valve 221 and stopping the operation of the compressor 300. As a result, when the vehicle is stopped, a water supply line, the inside of the high pressure pump 212, and a pipe are dried using compressed air from the compressor 300. Also, when the vehicle is stopped, the compressor 300 is maintained at uniform pressure and the valve 221 remains opened to allow dried air to pass through the nozzle 222 and to be discharged to the water tank 211 through the valve 221 and the high pressure pump 212 and to allow air flowing backward to dry every component related to supply of water. Accordingly, even when the fuel cell vehicle is cold-started, evaporation is enabled through water injection to directly cool air that is supplied to the stack 100. Since water is evaporated even without a humidifier, which is essential in prior art fuel cell vehicles, cost may be reduced.

As described above, according to the present disclosure, even when the fuel cell vehicle is cold-started, evaporation is enabled through water injection to directly cool air that is supplied to the stack. Since water is evaporated even without a humidifier, which is essential in prior art fuel cell vehicles, performance of the fuel cell system may be enhanced, while also reducing cost.

Hereinabove, although the present disclosure has been described with reference to various embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for water evaporation of a fuel cell, the system comprising:
    a stack provided in a fuel cell vehicle to produce electric power;
    an injection member connected to the stack, wherein the injection member includes
        a cooler part configured to allow water particles and heated air to be mixed in order to evaporate the water particles, and
        a pump part configured to supply pressurized water for generating the water particles to the cooler part; and
    a compressor configured to supply air heated by compression to the cooler part,
    wherein the injection member further includes a valve configured to control supply or cutoff of the water from the pump part and to allow the air from the compressor to be supplied to the pump part when a pump of the pump part is reversely rotated.

2. The system according to claim 1, wherein the injection member further includes
    a controller that controls the pump part and the cooler part and the pump part,
    wherein the cooler part is connected to the pump part, and
    wherein the pump part is configured to retain water generated in the stack.

3. The system according to claim 1, wherein the pump part includes
    a water tank that is configured to retain water discharged or collected from the stack and
    wherein pump is provided within the water tank and configured to supply the pressurized water to the cooler part.

4. The system according to claim 3, wherein the water tank has a drain valve that drains water to adjust a water level of the water tank.

5. The system according to claim 3, wherein the pump part further includes:
    a first pipe that connects the pump and the cooler part and allows air to be supplied through the compressor;
    a heater connected to the pump and generating heat; and
    a second pipe connecting the pump and the heater.

6. The system according to claim 5, wherein the second pipe has an outlet that is perpendicular to the ground to prevent introduction of water retained in the water tank.

7. The system according to claim 5, wherein an additional water tank, which includes the heater, is provided within the water tank, the additional water tank having a water hole allowing water to be introduced from the water tank.

8. The system according to claim 5, wherein the valve is configured to control supply or cutoff of water from the pump and to allow air from the compressor to be supplied to the first pipe when the pump is reversely rotated.

9. The system according to claim 8, wherein the cooler part further includes:
    a nozzle that injects water supplied from the pump; and
    an evaporator that evaporates water particles injected from the nozzle.

10. The system according to claim 9, wherein the cooler part has a temperature sensor that senses a temperature of an outlet of the compressor and a temperature of an outlet of the evaporator.

11. The system according to claim 9, wherein the cooler part has a pressure sensor that senses pressure of water supplied from the pump part.

12. A device for water evaporation of a fuel cell, the device comprising:
    a water tank provided in a fuel cell vehicle, the water tank connected to a stack that produces electric power, and that retains water generated in the stack;
    a pump provided in the water tank and supplying pressurized water,
    a valve connected to the pump and controlling supply and cutoff of water;

a nozzle that injects water supplied from the pump;
a compressor that supplies air heated by compression toward water particles injected from the nozzle; and
an evaporator provided at one end of the nozzle and allowing injected water particles and air from the compressor to be mixed to evaporate water,
wherein the valve is configured to allow the air from the compressor to be supplied to the pump.

13. The device according to claim 12, wherein the nozzle determines a water injection angle and water particle size.

14. The device according to claim 12, further comprising
a temperature sensor that senses a temperature of the compressor and a temperature of the evaporator; and
a pressure sensor that senses water pressure of the pump.

15. A control method for water evaporation of a fuel cell, the control method comprising the steps of:
stopping water injection from a nozzle provided in a cooler part and stopping an operation of a pump provided in a pump part when a fuel cell vehicle is stopped;
reversely rotating the pump and maintaining air pressure of a compressor;
opening a valve provided in the cooler part and supplying air from the compressor to the inside of a water tank provided in the pump part; and
closing the valve and stopping an operation of the compressor.

* * * * *

UNITED STATES PATENT AND TRADEMARK OFFICE
CERTIFICATE OF CORRECTION

PATENT NO. : 10,818,941 B2  
APPLICATION NO. : 15/365732  
DATED : October 27, 2020  
INVENTOR(S) : Yong Gyu Noh and Hyuck Roul Kwon Page 1 of 1

It is certified that error appears in the above-identified patent and that said Letters Patent is hereby corrected as shown below:

In the Claims

Column 8  
Claim 2, Line 15, please delete "the pump part and".

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*